(No Model.)
A. LISTON & C. SCHICK.
CORN PLANTER.
No. 514,943.     Patented Feb. 20, 1894.
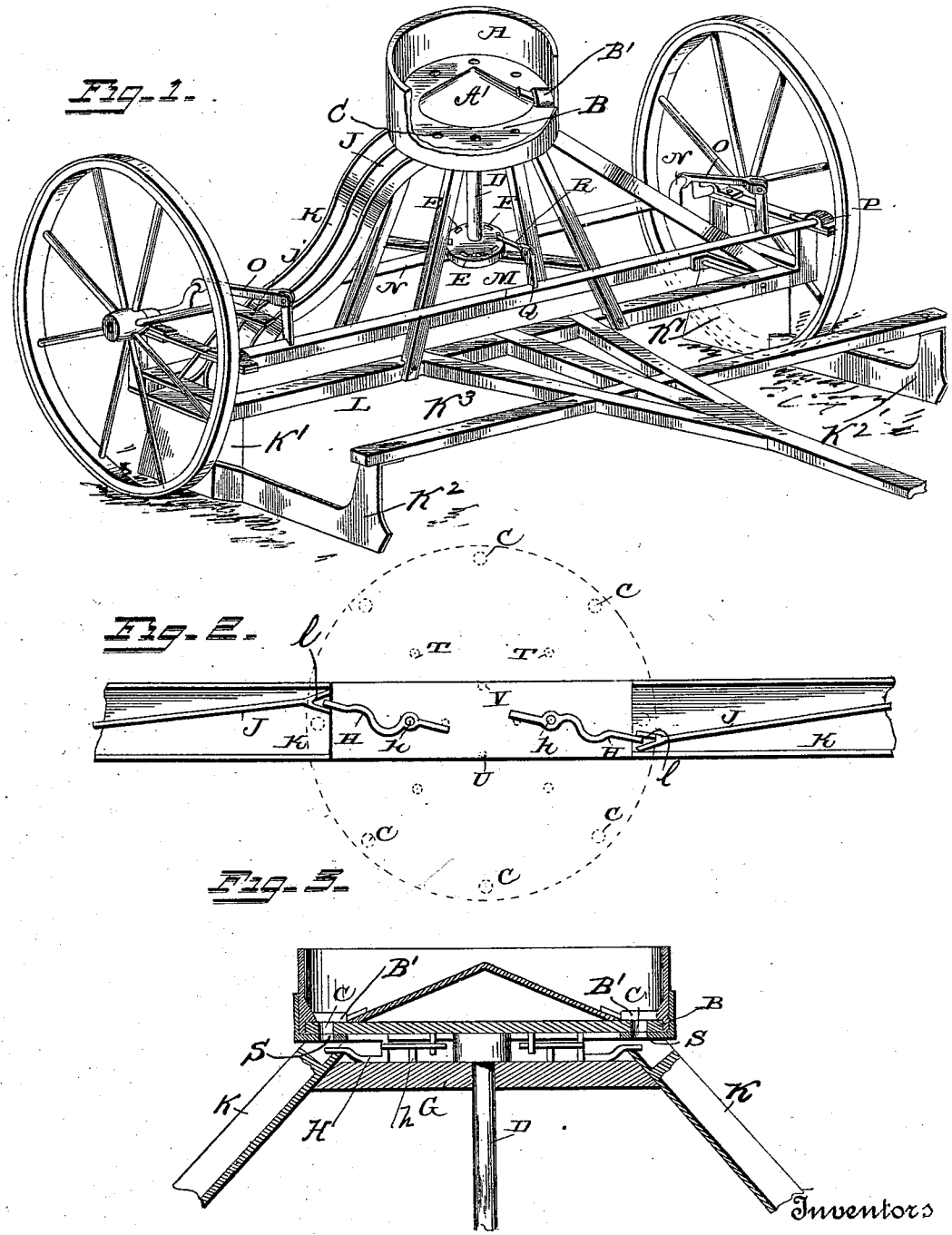
Witnesses
Inventors
Alfred Liston
and
Charles Schick
By John C. Wedderburn
Their Attorney

UNITED STATES PATENT OFFICE.

ALFRED LISTON AND CHARLES SCHICK, OF IMOGENE, IOWA.

CORN-PLANTER.

SPECIFICATION forming part of Letters Patent No. 514,943, dated February 20, 1894.

Application filed September 25, 1893. Serial No. 486,445. (No model.)

*To all whom it may concern:*

Be it known that we, ALFRED LISTON and CHARLES SCHICK, of Imogene, in the county of Fremont and State of Iowa, have invented certain new and useful Improvements in Corn-Planters; and we do hereby declare the following to be a full, clear, and exact description of the invention, such as will enable others skilled in the art to which it appertains to make and use the same.

Our invention relates to improvements in corn-planters, designed for simplicity of construction.

The object of our invention is to supply a corn-planter capable of planting two rows at once, and at the same time have only one box or holder for the seed instead of two, as in the old style of planters.

We also claim as our invention the improvements in the rotary drop explained below and represented in the accompanying drawings, in which—

Figure 1 is a perspective view of our planter. Fig. 2 is a plan of the drop, and Fig. 3 is a vertical section of the drop.

A designates a circular seed box containing a revolving disk B, placed upon the bottom of the said box, and having holes C therein near the periphery thereof. The disk B is attached to a vertical shaft D, the lower extremity of which carries a horizontally disposed wheel E with notches F therein. Just below the disk B and pivoted to a plate G by means of pivots $h$, are bent levers H, one end of each of which engages and fits into the inner forked end $l$ of oscillating divisions or flirt valves J, mounted in inclined outwardly extending chutes K, and pivoted as at $j'$.

On the frame L is mounted a shaft M which is attached to a bent or cranked axle N by means of rods O, said shaft having bearings P at its opposite ends. On the shaft midway between the bearings P is secured an upright arm Q in the upper end of which is pivotally mounted a pawl R whose free end is adapted to engage the notches F in the plate E. Through the bottom of the box A, extend holes S which are directly beneath the holes C in the disk B. The chutes K are arranged at a downward incline and communicate at their lower ends with conductors K' which extend to the ground, and in advance of which are runners or furrow openers $K^2$ for evident purposes, the said runners being connected at their upper portions by a cross bar $K^3$ to make them rigid. On the bottom of the disk B is a series of downwardly extending pins T, U, the inner pins U causing the levers H, and therefore the divisions J, to move in one direction, while the pins T cause them to move in the opposite direction.

The frame of the machine is sufficiently elevated to allow it to pass over the ridges in the ground. In the center of the box A is a cone-shaped elevation A' which is adapted to spread the corn or other seed which may be used directly over the holes C. Over the said disk B, are suitable cut-offs B' which are located at opposite sides and serve to prevent too much or more than a given quantity of corn or other grain from passing downwardly into the holes in the disk.

In operation, as the shaft N revolves, the shaft M vibrates and the arm Q is oscillated backwardly and forwardly thereby revolving the wheel E through a distance equal to the distances apart of the notches F, thus causing the shaft D and disk B to revolve. As the holes in the disk pass those in the bottom of the box A, the seed passes through and into the chute K on opposite sides, and from thence is delivered into the conductors K'. Of course the divisions J regulate the dropping of the seed from the chutes and two rows can be planted at one and the same time, the divisions acting as checks to regulate the dropping of the seed.

Having thus described the invention, what is claimed as new is—

In a corn planter, the combination of a circular seed box, having holes in the bottom thereof, a revolving feed disk, having holes extending therethrough, a vertical shaft, to the upper part of which said disk is attached, a wheel on the lower portion of said shaft having notches therein, a shaft with an arm having a pawl thereon engaging said notched wheel, a cone-shaped elevation over the said revolving disk adapted to deflect the seed directly to the holes in the feed disk, bent levers H under said seed box, chutes on the opposite sides of said seed box having oscillating flirt valves therein, with inner forked ends engaged by the outer ends of said levers, and pins extending downwardly from the bottom of the said seed disk, substantially as described.

In testimony whereof we have signed this specification in the presence of two subscribing witnesses.

ALFRED LISTON.
CHARLES SCHICK.

Witnesses:
R. ADDY,
J. D. BUZZARD.